June 2, 1964   B. H. CARSON ETAL   3,135,518
UNITIZED RADIAL SHAFT SEALS
Original Filed Oct. 23, 1961
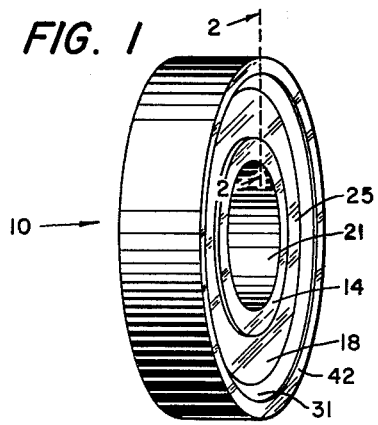
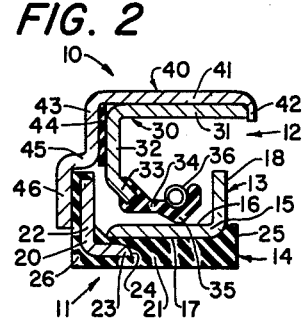
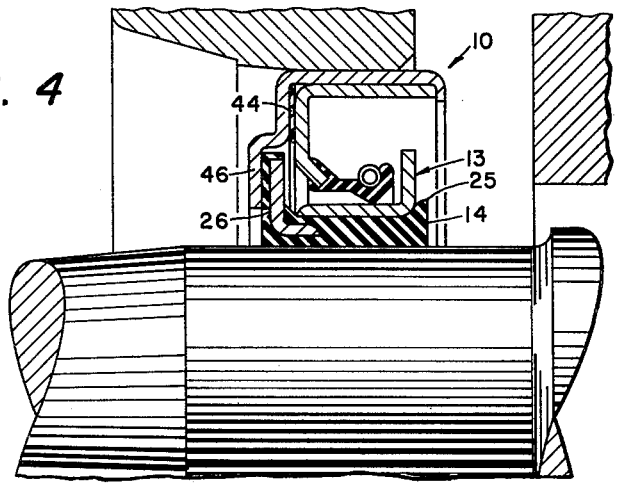
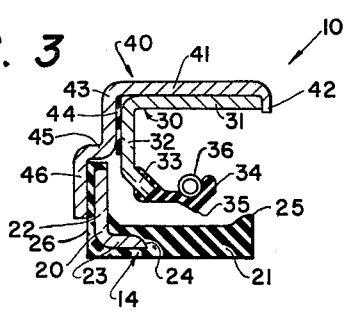
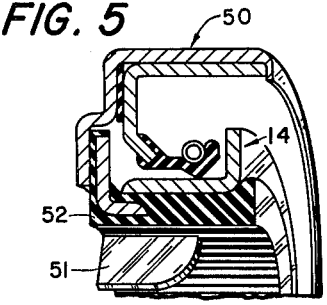

United States Patent Office 3,135,518
Patented June 2, 1964

3,135,518
UNITIZED RADIAL SHAFT SEALS
Brian H. Carson, Woodside, and John G. Barr, Redwood City, Calif., assignors to Federal-Mogul-Bower Bearings, Inc., Detroit, Mich., a corporation of Michigan
Continuation of application Ser. No. 146,782, Oct. 23, 1961. This application Apr. 23, 1962, Ser. No. 189,525
18 Claims. (Cl. 277—37)

This invention relates to improvements in unitized radial shaft seals. This application is a continuation of application Serial No. 146,782 filed October 23, 1961, now abandoned.

Patent 3,021,161 discloses a particularly good unitized shaft seal, and the present invention relates to improvements upon some forms of the invention covered by that patent. In a unitized shaft seal a wear sleeve is provided as part of an assembly to provide a manufacturer-supplied surface for the sealing lip to ride upon. The invention of Patent 3,021,161 was characterized by having a wear sleeve made in two pieces, one of which is in contact with the shaft while the other is in contact with the sealing lip of the radial sealing member and is also in contact with the first-mentioned piece. The seal can be used in environments having relatively high speed, where heretofore the heat generated by the friction of the lip on the wear sleeve tended to cause trouble. The seal of Patent 3,021,161 dissipates the heat by providing an oil-slinging flange on the wear sleeve; lubricant hitting the flange is very rapidly accelerated and leaves the slinger tangentially at speeds greatly in excess of the surface speeds obtained between the rotating shaft and any oil which may be in contact with the shaft. Since the efficiency and rate of heat transfer between a fluid and a solid is proportional to the square of the velocity between the two, the flinging provides a very helpful cooling action.

In some forms of this invention difficulties were experienced in spinning over a metal portion of the shaft-contacting wear sleeve piece to which a rubber liner had been bonded in order to provide the shaft with an elastomeric push-fit to the seal. Spinning was the most natural way of completing unitization of the two wear sleeve components to each other and, in some constructions, was the main operation of uniting the entire assembly. However, it became necessary in many instances to remove tightly bonded rubber flash from the portion of the metal case that was to be spun over; otherwise, the spinning operation became impractical. This removal was time-consuming and increased the cost of the seal.

An important object of the present invention is to solve this problem of unitizing the wear sleeve and seal. It does this by providing a seal of the type of Patent 3,021,161 in which the secondary closing and spinning operations are eliminated, and a simple push-fit of the lip-contacting wear sleeve past a rubber retaining member unitizes the seal. Moreover, by this means it becomes possible to have a quite loose assembly between the lip-contacting wear sleeve member and the member having the rubber liner, for when the shaft is inserted through the seal the rubber liner is then compressed under that wear sleeve member and causes it to be gripped tightly and therefore to be driven at the same speed as the shaft.

The present invention has an additional advantage in that the rubber sleeve may be extended further than is actually required to retain the sleeve and provided with specially shaped protrusions for sealing a keyway in the shaft on which the seal rides. Such a keyway may completely pass underneath the seal and would otherwise provide a path for the oil to leak out in spite of the seal assembly.

Other objects and advantages of the invention will appear from the following description of some preferred forms thereof.

In the drawings:
FIG. 1 is a view in perspective of a unitized seal embodying the principles of the invention.
FIG. 2 is an enlarged fragmentary view in elevation and in section of the seal of FIG. 1, taken along the line 2—2 in FIG. 1.
FIG. 3 is a view like FIG. 2 with the metal wear ring removed.
FIG. 4 is a fragmentary view in elevation and in section of an installation incorporating the seal of FIG. 1.
FIG. 5 is a fragmentary view in perspective and in section of a modified form of a unitized seal also embodying the invention.

FIGS. 1 to 4 show a unitized seal 10 having a wear sleeve assembly 11 and a sealing assembly 12. The wear sleeve assembly 11 includes two nested flanged annular rings 13 and 14. The ring 13 is all metal and is provided with a cylindrical wear sleeve portion 15 having a radially outer sealing surface 16 and an opposite radially inner surface 17. A radial oil-flinging flange 18 extends from one end of the cylindrical portion 15, giving the ring 13 a general L-shape as seen in cross-section. Preferably, the ring 13 is formed by drawing a flat annular steel ring. The drawing is done by exertion of force on the radially inner surface 17 so that any scratches which may be produced on that side do not affect the sealing surface 16. Minor undulations on the sealing surface 16 are insignificant and do not contribute to wear of the sealing lip. Thus, a smooth sealing surface is provided without any necessity whatever for grinding.

The seal 10 is generally similar to the seal shown in FIG. 6 of Patent 3,021,161 but has some important differences residing principally in the structure of the ring 14 and with resulting differences in the assembly of the seal 10. In the present invention the ring 14 comprises a metal member 20 and a rubber member 21 bonded to the metal member 20. The metal member 20 is a ring generally L-shaped in cross-section having a radial flange 22 extending out from one end of a short axially extending portion 23. The axially extending portion 23 is quite short, much shorter than the cylindrical portion 15 of the ring 13. As in Patent 3,021,161 there is a rubber lining on the inner ring, but in the present invention the rubber lining 21 covers both sides of the portion 23 and extends a considerable distance beyond the end 24 of the portion 23 providing the major length of the rubber-metal assembly 14, and it has a lip 25 at its outer end which provides the interlock connecting the ring 14 to the ring 13, thereby eliminating any spinning of metal. As it fits around the base of the flange 18, the lip 25 locks the two portions 13 and 14 of the wear sleeve 11 together, but the inner wear sleeve ring 13 is removable. This, of course, has advantages in that the lip 25 can be snapped down and the wear sleeve ring 13 removed and studied. It can even be replaced by a different ring 13, although that will rarely be the case in actual installation.

At its other end the rubber member 21 extends on at least one side of the radial flange 22 where it provides a type of bumper portion 26 that aids in providing a labyrinthine-type of sealing arrangement which prevents ingress of dirt from outside the oil seal 10.

The shaft seal assembly 12 may be any suitable type of shaft seal, the one shown being made by the method of Patent 3,004,298, having a case 30 with a cylindrical portion 31, a radial flange 32, and a bent-in terminal portion 33 to which is bonded an elastomeric sealing member 34 having a sealing lip 35 in engagement with the sealing surface 16. In the form shown, a spring 36 assures contact of the lip 35 with the surface 16, but a spring is not always needed and its inclusion or omission does not affect the present invention.

In the form of the invention shown in FIGS. 1–3, there is also an outer case member 40 having a cylindrical portion 41 with one end 42 spun around the free end of the cylindrical case portion 31. At the other end of the cylindrical portion 41, there is a radially in-turned portion 43 with a gasket 44 preferably between this portion 43 and the radial flange 32. There is also an offset portion 45 which lies radially out beyond the inturned terminal portion 33 and connects to a second radial portion 46 of the outer case 40. This structure gives a space in between the radial portion 46 and the radial flange 32, and the radial flange 22 of the ring 14 extends up into this space unitizing the ring 14 with the seal assembly 12, and therefore when the elastomeric lip 25 is snapped around the base of the flange 18, the entire seal is unitized. There may be a rather loose fit until the apparatus is installed on the shaft (FIG. 4) inside the bore, at which time the expansion of the rubber member 21 against the wear sleeve 13 acts to hold the wear sleeve 13 quite snugly. The seal flange 32 and the flange 46 of the case 40 limit the flange 22 and hence the assembly 11 within a short range of back-and-forth movement.

FIG. 5 shows a seal 50 identical to the seal 10 except for the provision of a keyway filling projection 51 on its inner liner 52. This illustrates how it is possible to make a unitized seal according to this invention that will fit the keyway of the shaft on which it is to be installed. The precise shape depends on that of the keyway, just as its presence or absence depends on whether the seal is to be located at or near such a keyway.

To those skilled in the art to which this invention relates, many additional changes in construction and widely differing embodiments of the invention will suggest themselves without departing from the spirit and scope of the invention as defined in the claims.

What is claimed is:

1. An annular unitized assembly for preventing lubricant loss between two relatively rotatable machine members comprising: a seal assembly having an annular case with a radial flange and an annular resilient member having a sealing lip; an outer annular case locked to said seal assembly and adapted to have a stationary leak-tight fit with one said machine member and having an annular radial flange surrounding the second said machine member and stepped to provide a radially outer portion abutting the radial flange of said seal assembly case and an axially outstepped radially inner portion spaced away therefrom; a metal ring providing a generally cylindrical wear sleeve engaged by said sealing lip; and a mounting and locking ring having a cylindrical elastomeric portion having a stationary leak-tight fit against said second said machine member and fitting flush against the inner periphery of said wear sleeve for most of its axial extent and having a rubber lip at one end adapted to engage one axial extremity of said wear sleeve and a metal member bonded to and supporting the other end of said elastomeric portion and having a radial portion lying between said radial flange of said seal assembly and said outstepped inner radial portion of said outer case so as to lock said mounting and locking ring to said cases.

2. The device of claim 1 wherein said radial flange of said mounting and locking ring has an elastomeric facing bonded thereto.

3. The device of claim 1 having a gasket between the outer portion of the radial flange of said outer case and the radial flange of said seal assembly case.

4. A unitized seal, including in combination: an annular seal assembly having a radial-type sealing lip; a generally cylindrical metal wear sleeve engaged by said sealing lip; a mounting and locking ring having a cylindrical elastomeric portion lying flush against the inner periphery of said wear sleeve for most of its axial extent and having locking means at one end adapted to hold one end of said wear sleeve, and a metal member bonded to and supporting the other end of said elastomeric portion; and means to lock said seal assembly to said mounting and locking ring so that the entire assembly is unitized upon installation of said wear sleeve.

5. In a plural-part annular unitized assembly for preventing lubricant loss between two relatively rotatable machine members, the combination of: a seal assembly having an inner annular case with a cylindrical portion and a radial flange at one end thereof and an annular resilient lip member secured to said inner case and having a sealing lip; an outer annular case locked to said seal assembly, with a cylindrical portion enveloping the cylindrical portion of said seal assembly case and adapted to have a stationary leak-tight fit with one said machine member and having an annular radial flange surrounding the second said machine member and stepped to provide a radially outer portion abutting the radial flange of said seal assembly case and an axially outstepped radially inner portion spaced away from the radial flange of said seal assembly case; a metal ring providing a generally cylindrical wear sleeve engaged by said sealing lip; and a mounting and locking ring having a cylindrical elastomeric portion adapted to have a stationary, leak-tight fit with said second machine member and fitting flush against the inner periphery of said wear sleeve for most of its axial extent and having a rubber lip at one end adapted to snap around one axial extremity of said wear sleeve and a metal member bonded to and supporting one end of said elastomeric portion and having a radial portion lying between said radial flange of said seal assembly and said outstepped inner radial portion of said outer case, so as to lock said mounting and locking ring to said cases so that the entire assembly is unitized upon installation of said wear sleeve.

6. In a plural-part annular unitized seal assembly for preventing lubricant loss between a shaft and a bore, the combination of:
   an outer annular case having a cylindrical portion for snugly engaging said bore and a radial flange at one end of said cylindrical portion, said flange having an axially outstepped inner radial portion;
   an inner annular case within said outer case having an annular radial flange at one end thereof in opposed relation to said flange of said outer case;
   an annular resilient lip element supported by said inner case;
   a metal wear sleeve in rotary sealing engagement with said lip element; and
   a mounting sleeve having a cylindrical elastomeric portion extending the length of said wear sleeve and in engagement therewith and a rigid radially outwardly extending member secured to one end of said elastomeric portion and trapped between the two said radial flanges of said cases.

7. The device according to claim 6 wherein said radially outwardly extending member has a radially extending elastomeric facing bonded thereto.

8. A unitized shaft seal for preventing lubricant loss from between two relatively rotating members while also protecting them from the ingress of foreign matter between them, including in combination: two annular metal members, both L-shaped in cross-section to provide a cylindrical portion and a radial flange, the cylindrical portion of the inner of said metal members being much shorter than that of the outer said metal member, said metal members being nested together with the outer surface of the cylindrical portion of one facing the inner surface of the cylindrical portion of the other, their radial flanges being at opposite ends; an elastomeric member secured to the inner of said annular members and in contact with most of the inner surface of the cylindrical portion of the outer said metal member and adapted to snugly engage the inner said rotating member to secure said metal members against relative axial and rotative movement; a shaft-sealing assembly adapted to engage the other said rotating member and having a sealing lip in rotary sealing engagement with the surface of said cylindrical portion of the outer said nested metal member; and means unitizing said shaft sealing assembly to said two metal members.

9. In a plural-part annular unitized seal assembly for preventing lubricant loss between two relatively rotatable machine members; an outer annular case adapted to have a stationary leak-tight fit with one said machine member and having an annular radial flange surrounding the second said machine member and stepped to provide an axially outstepped inner radial portion of said flange; an inner annular case within said outer case having an annular radial flange at one side thereof in opposed relation to said radial flange of said outer case; a gasket between said radial flanges; an annular resilient lip element secured to said inner case; and an annular two-ply wear sleeve assembly comprising two metal rings together, one providing a radially outer wear sleeve, and the other having secured to one end a radially inner mounting sleeve having a cylindrical elastomeric portion extending most of the length of said wear sleeve and a rubber lip at the other end adapted to snap around said wear sleeve.

10. The device according to claim 9 wherein said other metal ring has a radial flange in opposed relation to said radial flanges of said cases and between said cases.

11. The device according to claim 9 wherein said radial flange of said ring has an elastomeric facing bonded thereto and integral with said mounting sleeve.

12. A unitized shaft seal for preventing lubricant loss from between two relatively rotating members while also protecting them from the ingress of foreign matter between them, including in combination: two annular metal members, both L-shaped in cross section to provide a cylindrical portion and a radial flange, said metal members being nested together with the outer surface of the cylindrical portion of one facing the inner surface of the cylindrical portion of the other, their radial flanges being at opposite ends; an elastomeric member secured to the inner of said annular members and in contact with most of the inner surface of the cylindrical portion of the outer said metal member and adapted to snugly engage the outer said rotating member to secure said metal members against relative axial and rotative movement; a shaft-sealing assembly adapted to engage the other said rotating member and comprising a third metal member and a sealing lip supported by said third metal member in rotary sealing engagement with the surface of said cylindrical portion of the outer said nested metal member which lies on the opposite radial side from said elastomeric member, said lip and at least a portion of the third metal member lying axially between said radial flanges, said third metal member also providing a cylindrical portion, spaced radially from said nested members; and means unitizing said shaft sealing assembly to said inner metal member.

13. A radial shaft seal including in combination:
a shaft seal assembly having a metal case member and a resilient oil-sealing member having a sealing lip,
a wear sleeve having an axial cylindrical portion engaged by said lip; and
a wear-sleeve-supporting member comprising a reinforcing metal member having a radial flange and an elastomeric body bonded to said metal member and having an elongated axially extending generally cylindrical portion engaging the cylindrical portion of said wear sleeve, and
an enlarged lip portion on its outer peripheral end edge locking said wear sleeve to said wear-sleeve-supporting member and said seal assembly.

14. A radial shaft seal including in combination:
a shaft seal assembly having a metal case member with a radial flange and a resilient sealing lip,
a wear sleeve having an axial cylindrical portion engaged by the lip, and
a wear-sleeve-supporting member comprising a reinforcing metal member with a radial flange and an elastomeric body bonded to said metal member and having an elongated axial portion terminating in an outwardly extending locking lip and lining the periphery of said supporting member, said wear sleeve being supported by said elongated axial portion and locked in by the locking lip.

15. A unitized radial shaft seal including in combination:
a shaft seal assembly having a metal case member and a resilient oil-sealing member having a sealing lip,
a wear sleeve having an axial cylindrical portion engaged by said lip and a radially outwardly extending oil flinging portion, and
a wear-sleeve-supporting member comprising a reinforcing metal member having a flange and a short axial end portion and an elastomeric body bonded to said metal member and having an elongated axially extending generally cylindrical portion with an enlarged lip portion on its outer peripheral end edge, its outer periphery engaging the cylindrical portion of said wear sleeve with the lip portion beyond and against the said cylindrical portion,
said lip portion locking said wear sleeve to said wear-sleeve-supporting member and said seal assembly being retained between the radial flange of said wear-sleeve-supporting member and the radially outwardly extending oil flinging portion of said wear sleeve.

16. A unitized radial shaft seal including in combination:
a shaft seal assembly having a metal case member with a radial flange and a resilient sealing lip,
a wear sleeve having an axial cylindrical portion engaged by the lip and a radially outwardly extending oil flinging portion, and
a wear sleeve supporting member comprising a reinforcing metal member with a radial flange and an axial portion and an elastomeric body bonded to said metal member and having an elongated axial portion terminating in an outwardly extending locking lip and lining the periphery of said axial portion of said metal member, said elongated axial portion supporting said wear sleeve with the locking lip holding the oil-flinging portion of the wear sleeve.

17. A unitized radial shaft seal including in combination:
a shaft seal assembly having a metal case with a radial flange and a sealing lip supported by said case,
a wear sleeve having an axial cylindrical portion engaged by the lip and a radially outwardly extending oil flinging portion,
an outer case holding said seal assembly and having an inner radial portion spaced away from said radial flange, and
a wear-sleeve-supporting member with a rigid reinforcing member having a radial flange and a short axial end portion and an elastomeric body bonded to said metal member and having an elongated generally cylindrical portion fitting against the cylindrical portion of said wear sleeve with an enlarged generally radial lip projecting out from its outer peripheral end edge and locking against the radially outwardly extending oil flinging portion.

18. A unitized radial shaft seal including in combination:
a shaft seal assembly having a metal case member with an axial flange, a radial flange, and an anchor portion, and an elastomeric member secured to said anchor portion and having a sealing lip,
a wear sleeve having an axial cylindrical portion engaged by the lip and a radially outwardly extending oil flinging portion at the opposite axial end from said radial flange, an outer case holding said seal assembly and having a cylindrical flange against which the axial flange of said metal case member fits, said cylindrical flange having an inturned end portion clamping said axial flange, an outer radial portion against which a portion of the radial flange of the metal case member is forced by said inturned end portion, and an offset inner radial portion joined to said outer radial portion by an offset axial portion, a gasket between said radial flange and said outer radial portion, a wear-sleeve-supporting member comprising a metal member having a radial flange and a short radially inner axial end portion, and an elastomeric body bonded to said metal member and covering its inner periphery and extending axially well beyond said short axial end portion to provide a generally cylindrical portion with a radially outwardly extending locking lip, said cylindrical portion lying snugly against the inner periphery of said wear sleeve with said locking lip engaging and holding said radially outwardly extending oil flinging portion of the wear sleeve, said elastomeric body also covering the surface of said radial flange of said metal member that lies on the opposite side of said metal member from said locking lip, said radial flange of said metal member lying between said radial flange of said case member and said inner radial portion of said outer case.

References Cited in the file of this patent

UNITED STATES PATENTS

| | | |
|---|---|---|
| 2,105,777 | Smith | Jan. 18, 1938 |
| 2,752,176 | Ayling | June 26, 1956 |
| 2,985,475 | Peickii et al. | May 23, 1961 |
| 3,011,814 | Rhoads et al. | Dec. 5, 1961 |
| 3,021,161 | Rhoads et al. | Feb. 13, 1962 |